United States Patent [19]

Ernst et al.

[11] 4,012,025
[45] Mar. 15, 1977

[54] MOLD FOR PLASTICS, PARTICULARLY MULTI-COMPONENT PLASTICS INJECTION MOLD HAVING BLIND CHANNEL

[75] Inventors: Rudolf Ernst, Munich-Solln; Fritz W. Schneider, Strasslach-Hailafing; Helmut Clausen, Strasslach-Munich, all of Germany

[73] Assignee: Firma Elastogran Maschinenbau GmbH & Co., Munich, Germany

[22] Filed: Apr. 10, 1975

[21] Appl. No.: 566,692

[30] Foreign Application Priority Data

Apr. 13, 1974 Germany .......................... 2418247

[52] U.S. Cl. .................. 249/105; 249/107; 425/242 R; 425/DIG. 229
[51] Int. Cl.² ......................................... B29F 1/00
[58] Field of Search ................. 249/105, 107, 110; 425/242, 244, 251, 245, DIG. 227–DIG. 229, DIG. 224–DIG. 226, 812; 164/134

[56] References Cited

UNITED STATES PATENTS

| 1,652,445 | 12/1927 | Lee | 249/110 |
|---|---|---|---|
| 2,672,653 | 3/1954 | Simpkins | 249/110 |
| 3,120,680 | 2/1964 | Villasana | 249/110 |
| 3,799,494 | 3/1974 | McLean, Jr. | 425/812 |
| 3,807,921 | 4/1974 | Murgatroyd | 425/245 |
| 3,819,313 | 6/1974 | Josephsen et al. | 425/244 |

FOREIGN PATENTS OR APPLICATIONS

| 2,118,307 | 4/1971 | Germany | 425/242 |
|---|---|---|---|
| 2,141,278 | 9/1972 | Germany | 249/105 |

*Primary Examiner*—Francis S. Husar
*Assistant Examiner*—John McQuade
*Attorney, Agent, or Firm*—H. Dale Palmatier

[57] ABSTRACT

A mold including a blind channel connected to the sprue runner so that the first material entering the mold will be trapped in the blind channel.

3 Claims, 3 Drawing Figures

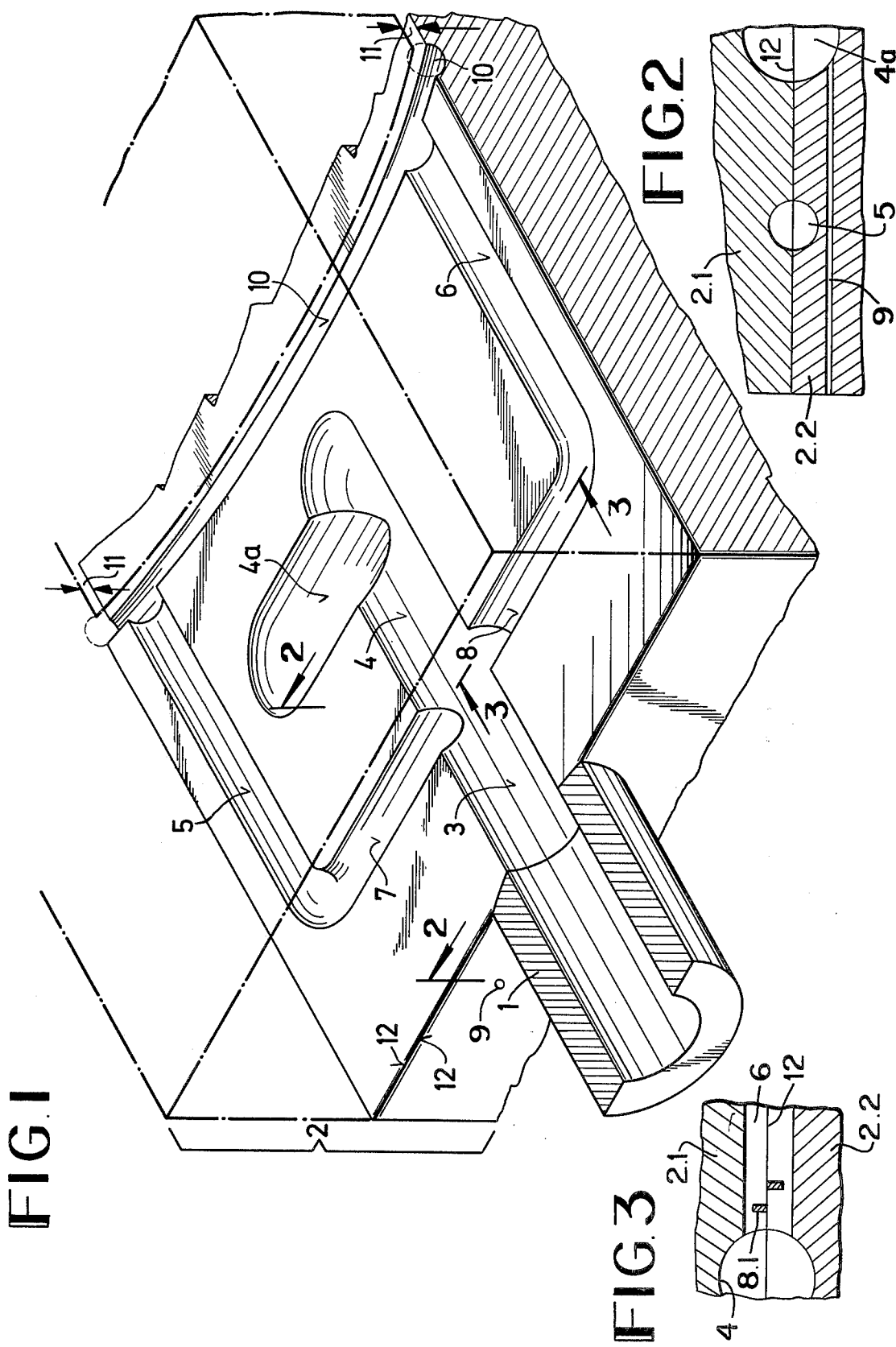

MOLD FOR PLASTICS, PARTICULARLY MULTI-COMPONENT PLASTICS INJECTION MOLD HAVING BLIND CHANNEL

The present invention relates to a mold for plastics which is particularly suitable for multi-component plastics. In the jointing plane of the mold is provided a sprue runner connected to the mold cavity proper.

Multi-component plastics such as polyurethanes are commonly mixed within a mixing apparatus so that the pressurized components may be dispensed into a mixing chamber in which the components are intimately mixed with each other. From the mixing chamber the mixed components, i.e. the component mixture will be discharged into a mold. Particularly with multi-component plastics there is frequently encountered the difficulty that one of the components "advances", i.e. is discharged earlier than the other component. When such advancing occurs the mixture will not have the desired and adjusted mixture ratio in the initial phase of the mixing step. The mixing step is sometimes also referred to as "shot". The first portion of the mixture discharged into the mold is for this reason often not of the desired specification, i.e. does not correspond to the adjusted mixture ratio and therefore does not exhibit the desired properties.

It is now the object of the present invention to provide a novel and improved mold for plastic materials in which are avoided the disadvantages associated with the advancing effects of components.

In accordance with the present invention, this object is achieved in a mold of the type stated above wherein the sprue runner includes in the jointing plane of the mold a blind channel for receiving the material initially discharged from the filling device.

By the fact that in accordance with the present invention the feed head portion of the mold includes a blind channel for receiving the material initially discharged from the filling device, all not properly adjusted mixture in the initial phase of a shot will not enter the mold but will be received by the blind channel and may be discarded together with the feed head after opening of the mold. The dimensions of the blind channel are selected so as to ensure that no further advancing phenomenon will be encountered when the blind channel has been filled. In other words, the correct mixture ratio will have been adjusted at the moment at which the blind channel has been filled up.

In the mold of the present invention preferably means are provided for reducing the flow resistance for the casting material into the blind channel below the flow resistance into the downstream portion of the sprue runner.

Advantageously, the desired flow conditions are achieved by means of a baffle which is arranged on the downstream side of the junction between sprue runner and blind channel.

The configuration and the location of the blind channel are selected so that the mixture entering the mold must necessarily enter in the initial phase the blind channel and does not enter any other portions of the sprue runner until the blind channel has been filled entirely with the mold material. In the mold of the present invention, the sprue runner may consist of a single conduit or may be subdivided into several channels. The present invention ensures that a correctly adjusted mixture without ratio deviations due to advancing effects will be discharged into the mold cavity proper.

The essential aspect of the solution proposed by the present invention is to prevent that in the initial phase of a shot a not yet properly adjusted component mixture may be discharged from the mixing apparatus into the mold and may thereby enter the mold cavity proper. The initially discharged mixture which may be defective due to advancing effects or other adverse conditions will be trapped within the blind channel, and subsequently this blind channel forms part of the feed head which may be separated from the molded article upon termination to the molding operation.

Further advantages and the details of the invention will be described in the following with reference to an illustrative embodiment shown in the appended drawings.

FIG. 1 is a schematical cross sectional view in perspective along the jointing plane of the embodiment of the inventive mold.

FIG. 2 is a detail section view at 2—2 of FIG. 1; and

FIG. 3 is a detail section at 3—3 of FIG. 1 and illustrating a modified form.

Referring to the drawings, the outlet of a partly shown mixing chamber 1 has been lowered onto a likewise partly shown mold 2 which has lower and upper mold sections 2.1 and 2.2 confronting each other at the jointing or parting plane 12. A sprue runner 3 is defined in the illustrated feed head region or plastics-receiving portion of the mold 2. The sprue runner 3 extends from the upper side of the mold downwardly into the mold body and branches sideways toward the left and the right, as may be seen in the drawing. In the here contemplated embodiment two sprue runner branches 5 and 6 are provided. The sprue runner branches 5 and 6 open at their remote ends into a distribution conduit 10, and this distribution conduit 10 is in turn in communication with a slot 11. From the slot 11 the molding material will be discharged into the mold cavity proper (not shown).

As may be seen from the drawing, the sprue runner 3 extends beyond the branch-off region in defining a blind channel 4. The remote end of the blind channel 4 is in communication with a vent conduit or the like 9. The vent conduit 9 allows air that will be trapped in the blind channel 4 by the entering mixture to escape to the ambient atmosphere so that the mixture may enter the blind channel 4 unobstructedly. The sprue runner branches 5 and 6 are of a smaller cross sectional area then the spure runner 3. In the regions indicated by reference numerals 7 and 8 the two sprue runner branches 5 and 6 may, as illustrated in FIG. 3, additionally be provided with baffles 8.1, or other restrictions or the like not shown at which the cross sectional area of the sprue runner branches is still further reduced. By the reduction of the cross sectional area of the sprue runner branches it will be ensured that the material initially entering the mold 2 will be received in the blind channel 4, and not until this blind channel 4 has been filled up the subsequently supplied material will enter the sprue runner branches 5 and 6.

When the mold, i.e. the mold cavity proper has been filled with molding material and the molding operation has been completed, the mold will be opened along the jointing plane 12 which coincides with the plane of the drawing. Then the whole feed head portion including the contents of the blind channel 4 may be separated from the molded article and discarded.

The vent conduit 9 shown in the drawing is merely schematical to show that the blind channel 4 must be vented in any suiable manner to the ambient atmosphere. The same applies likewise to all of the features shown in the schematical drawing which is merely intended to demonstrate the principles of the invention mold.

As will be apparent from the foregoing description, one aspect of the present invention is the improved method, in the art of delivering multi-component plastics from a plastics mixer to the mold cavity in a sectional mold, the method steps including directing the multi-component plastics into the plastics-receiving portion of the mold under considerable pressure from the mixer and directing the initial advances of the plastics through the sprue and sprue runner of the mold; confronting the initial advances of the plastics moving through the sprue runner with alternate channels to follow, one having a significant restriction to flow of plastics therethrough, and the other having essentially no restriction to the initial advances of the plastic as compared to the restrictions afforded by the sprue runner; directing the initial advances of the plastics to the alternate channels respectively having substantial and essentially no restriction to flow; forming a blind channel receiving the initial advances of the plastics flowing with substantially no restriction from the sprue runner until the blind channel is filled; and thereafter directing the plastics against the significant restriction to flow in the sprue runner branch and overcoming said significant restriction and directing the subsequent portions of the plastics into and through the sprue runner branch for delivery to the mold cavity.

The foregoing disclosure and description of the invention is illustrative and explanatory thereof, and various changes in the size, shape and in the details of the illustrated construction may be made without departing from the spirit of the invention.

We claim:

1. In a mold for multi-component plastics wherein cooperating mold sections confront each other at plane surfaces and cooperate with each other to define a plastics-receiving portion and a mold cavity communicating with the plastics-receiving portion to receive plastics therefrom, th plastics-receiving portion including a sprue runner, a blind channel with an inlet end in unobstructed open communication and longitudinal alignment with the sprue runner and having substantially the same cross-sectional flow area as the sprue runner, the inlet end being the only plastics flow access to the blind channel, and a sprue runner branch in communication with the sprue runner and intersecting the sprue runner in a direction transversely of the sprue runner, the sprue runner branch delivering plastics to the mold cavity, the sprue runner branch having a significant restriction to flow of plastics from the sprue runner as compared to the free flow of plastics through the unobstructed open communicaton into the blind channel from the sprue runner, the restriction being located adjacent the intersection of the sprue runner branch with the sprue runner.

2. The invention according to claim 1, wherein the blind channel and the sprue runner branch both have communication with the sprue runner at about the same location, and the cross-sectional flow area of the sprue runner branch is significantly less than the cross-sectional flow area of the blind channel for relatively reducing the flow resistance for the plastics into the blind channel below the flow resistance into the sprue runner branch.

3. The invention according to claim 1, wherein the sprue runner branch has a baffle therein adjacent the intersection between the sprue runner and the sprue runner branch.

* * * * *